US012429198B1

(12) United States Patent
Cacciabeve

(10) Patent No.: US 12,429,198 B1
(45) Date of Patent: Sep. 30, 2025

(54) FOLDABLE HEAD LIGHT

(71) Applicant: Walter R. Tucker Enterprises, Ltd., Deposit, NY (US)

(72) Inventor: Robert Cacciabeve, Denville, NJ (US)

(73) Assignee: Walter R. Tucker Enterprises, Ltd, Deposit, NY (US)

(*) Notice: Subject to any disclaimer, the term of this patent is extended or adjusted under 35 U.S.C. 154(b) by 0 days.

(21) Appl. No.: 18/977,270

(22) Filed: Dec. 11, 2024

(51) Int. Cl.

| | |
|---|---|
| ***F21V 21/084*** | (2006.01) |
| ***F21L 4/08*** | (2006.01) |
| ***F21V 23/04*** | (2006.01) |
| ***F21V 23/06*** | (2006.01) |
| *F21Y 115/10* | (2016.01) |

(52) U.S. Cl.
CPC .............. *F21V 21/084* (2013.01); *F21L 4/08* (2013.01); *F21V 23/04* (2013.01); *F21V 23/06* (2013.01); *F21Y 2115/10* (2016.08)

(58) Field of Classification Search
CPC ........ F21V 21/084; F21V 23/04; F21V 23/06; F21L 4/08; F21Y 2115/10
See application file for complete search history.

(56) References Cited

U.S. PATENT DOCUMENTS

| | | | | |
|---|---|---|---|---|
| 4,254,451 | A * | 3/1981 | Cochran, Jr. | A44C 15/0015 345/82 |
| 6,997,552 | B1 * | 2/2006 | Hung | G02C 11/02 351/158 |
| 7,883,233 | B2 * | 2/2011 | Feinbloom | F21V 21/084 362/187 |
| 10,139,652 | B2 * | 11/2018 | Windham | G02C 11/04 |
| 10,935,815 | B1 * | 3/2021 | Castañeda | G02C 11/10 |
| 2020/0110289 | A1 * | 4/2020 | De La Fuente | G02C 11/04 |

OTHER PUBLICATIONS

MILWAUKEE 450 Lumens LED Spot/Flood Headlamp, https://www.homedepot.com, 5 pages.
Amazon Headlamp Rechargeable 230° Wide Beam Head Lamp, https://www.amazon.com, 7 pages.
Caterpillar CT4120 Multi-Function Headlamp, https://www.catlights.com, 2 pages.

* cited by examiner

*Primary Examiner* — Bao Q Truong
(74) *Attorney, Agent, or Firm* — Breiner & Breiner, L.L.C.

(57) ABSTRACT

A head light comprising a housing having a light source and adapted to fit on a user's forehead and first and second foldable arms attached to the housing and adapted to rest on the user's ears. Each foldable arm may fold in two places.

16 Claims, 6 Drawing Sheets

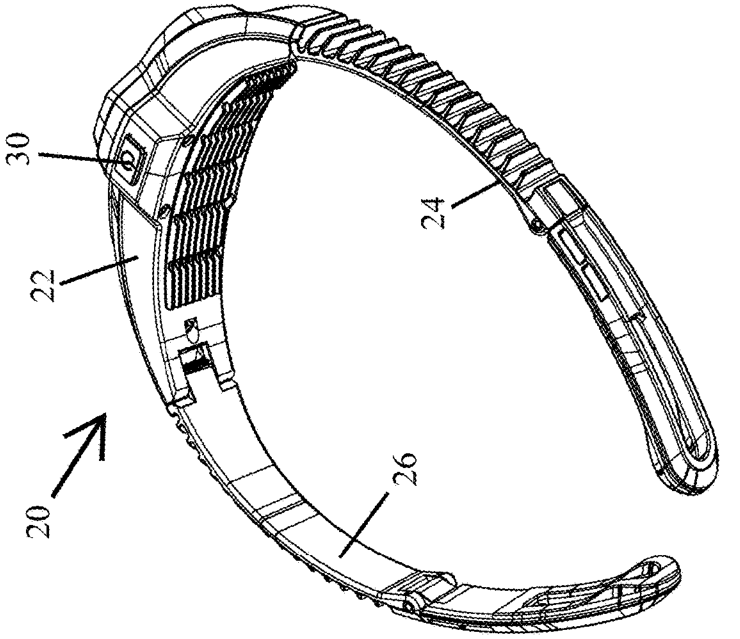
FIG. 2
FIG. 1A
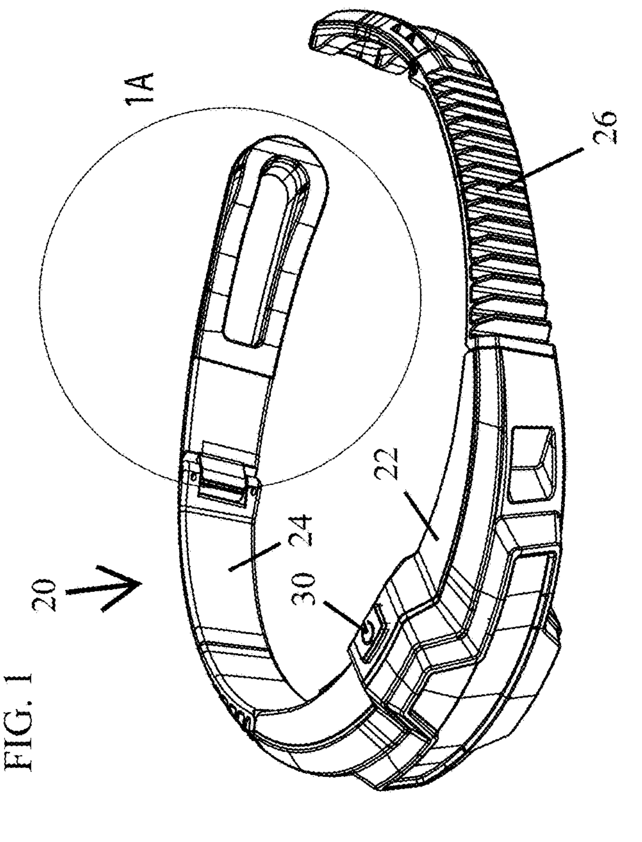
FIG. 1
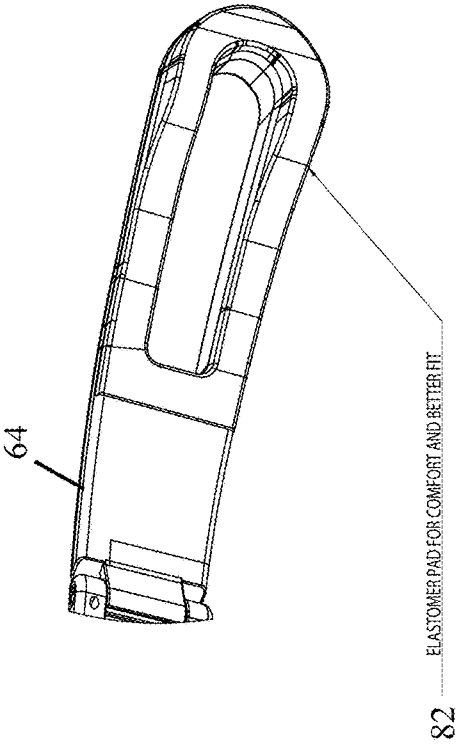

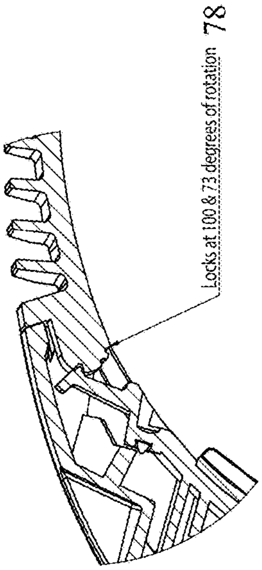
FIG. 10B
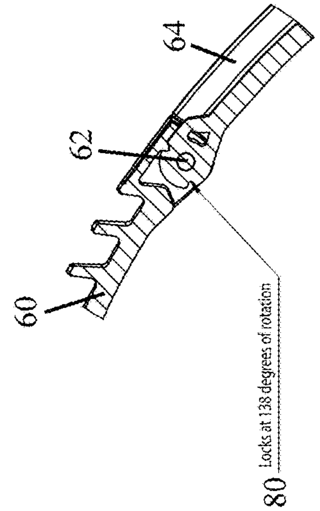
FIG. 10C
FIG. 10
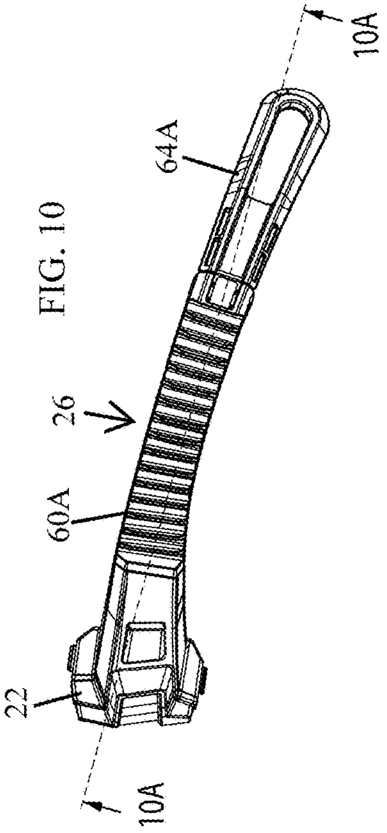
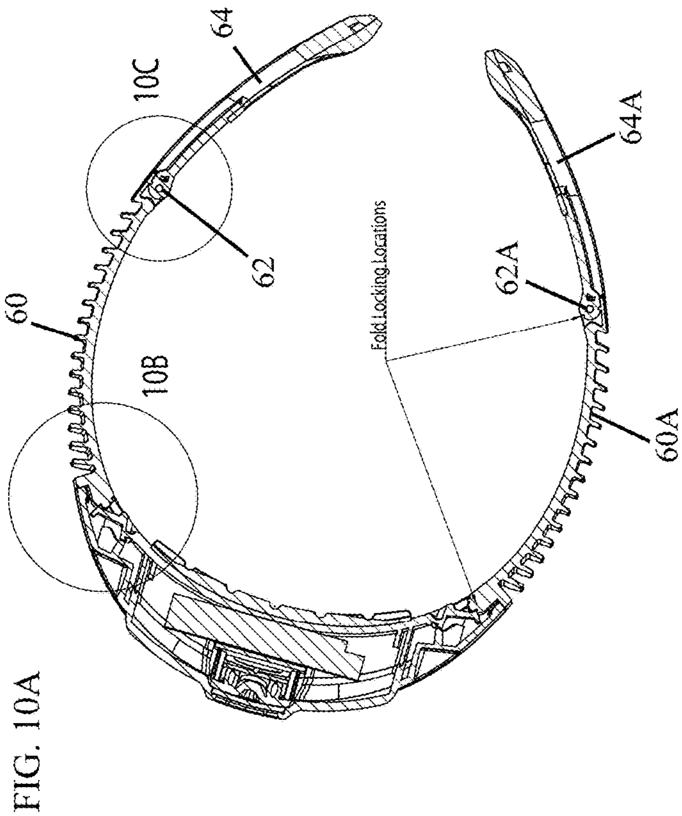
FIG. 10A

FOLDABLE HEAD LIGHT

FIELD OF THE INVENTION

The present invention relates to a head light. More particularly, the invention relates to a head light having foldable arms.

BACKGROUND OF THE INVENTION

Head lights are known in the art. For example, a head light is disclosed in E-Z Red Company's U.S. patent application Ser. No. 18/902,070, entitled "Head Light," filed Sep. 30, 2024, and which is incorporated herein by reference.

Other head lights are known such as the Milwaukee-450 Lumens-LED Spot Flood Head Lamp; the Amazon Headlamp Rechargeable 230° Wide Beam Head Lamp; and the Caterpillar Work Light CT4120.

As seen, head lights are known in the art. While these devices, such as the E-Z Red head light, provide a number of the desired attributes, there is always room for improvement. This application is directed to an improved head light.

SUMMARY OF THE INVENTION

The invention is directed to a head light having foldable arms. The light is wearable on a user's head and provides hands free lighting for work, recreation or other activities.

A primary object of the invention is to provide a head light having foldable arms.

Another primary object of the invention is to provide a head light having a first arm foldable in two places and a second arm foldable in two places.

Another object of the invention is to provide a head light having a front housing which fits comfortably on a user's forehead and foldable arms which rest comfortably on the user's ears.

Another object of the invention is to provide a head light having a central area light source for focusing light on an environment of use.

Another object of the invention is to provide a head light having a central area light source and a spotlight.

Another object of the invention is to provide a head light having foldable arms which rest comfortably on a user's ears and which includes ear members having an overmolded thermoplastic polymer rubber (TPR) which cushions the arms on the user's ears, thereby making the head light comfortable, including over extended periods of use.

Another object of the invention is to provide a head light powered by a battery, including a rechargeable battery.

Another object of the invention is to provide a head light wearable on a user's head made of a semirigid plastic such as ABS (acrylonitrile butadiene styrene) plastic. The head light has foldable arms which are sufficiently flexible to allow the arms to be pulled outward when placing the light on a user's head and once on a user's head rest on the user's ears.

Another object of the invention is to provide a head light having a rechargeable battery, a USB port and a battery charge indicator.

The head light of the invention comprises a housing having a light source and adapted to fit on a user's forehead and first and second foldable arms attached to the housing and adapted to rest on the user's ears. Each foldable arm may fold in two places.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 1 is a front and side perspective view of the head light of the invention.

FIG. 1A is an enlarged view of Section 1A of FIG. 1.

FIG. 2 is a rear and side perspective view of FIG. 1.

FIG. 10 is a side view of FIG. 1.

FIG. 10A is a cross-section take along lines 10A-10A of FIG. 10.

FIG. 10B is an enlarged view of Section 10B of FIG. 10A.

FIG. 10C is an enlarged view of Section 10C of FIG. 10A.

DETAILED DESCRIPTION OF THE PREFERRED EMBODIMENTS

The present invention is directed to a head light which is worn on the head of a user and focuses a light source on an environment of use. The head light includes a housing having a light source and adapted to fit on a user's forehead and first and second foldable arms attached to the housing and adapted to rest on the user's ears. Each foldable arm may fold in two places.

Figure 3A:
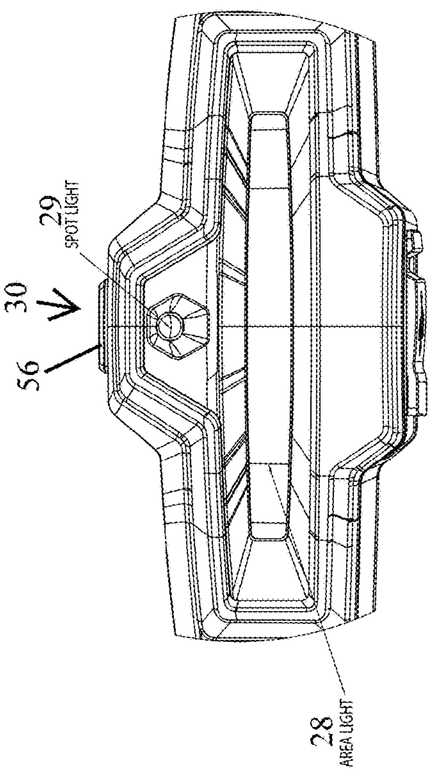
FIG. 3A is an enlarged view of Section 3A of FIG. 3.

Referring, for example, to FIGS. 1, 2 and 3A, there is shown a head light 20. The head light 20 includes a housing 22, a first foldable arm 24, a second foldable arm 26, light sources 28 and 29 and an on/off switch 30. The head light 20 will now be discussed in further detail.

Figure 8:
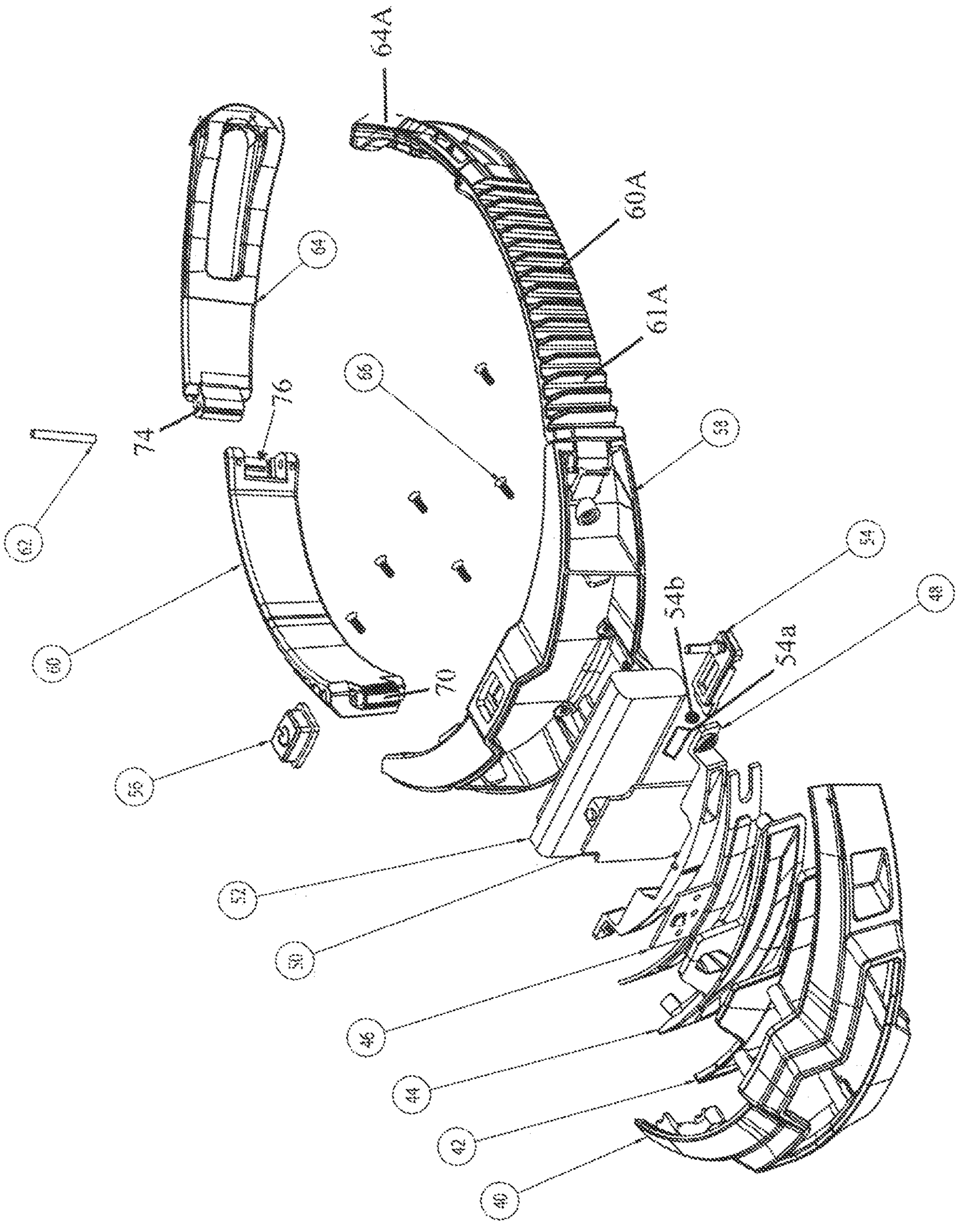
FIG. 8 is an exploded view of the head light of FIG. 1.

Referring to FIG. 8, there is shown an exploded view of the head light 20 as follows:

40 Front Light Housing
42 Lens
44 Reflector
46 LED
48 LED Anchor
50 PCB
52 Rechargeable Battery
54 Charge Port Cover
56 Button
58 Rear Light Housing
60 and 60A Front Folding Arms
62 and 62A Folding Arm Pins
64 and 64A Rear Folding Arms
66 Screws The first folding arm 24 having front and rear folding arms 60 and 64 and the second folding arm 26 are substantially the same.

The various components of the portable head light 20 will now be discussed. Housing 22 fits on a user's forehead and foldable arms 24 and 26 rest on the ears of the user. The foldable arms 24 and 26 may be flexible allowing the arms to be pulled outward when placing the light on a user's head and may contract once on a user's head and rest snuggly around the head and rest on the user's ears. Housing 22 may include an on/off switch 30 with button 56 and an LED light 46 for light sources 28 and 29.

Housing 22 comprises front light housing 40 and rear light housing 58. Within housing 22 are the lighting components including lens 42, reflector 44, LED 46, LED anchor 48, PCB 50, rechargeable battery 52, charge port cover 54, charge port 54*a* and button 56.

Folding arms 24 and 26 are substantially the same. Folding arm 24 will be described in relation to the drawings. Folding arm 24 includes a front folding arm 60 and a rear folding arm 64. The front folding arm 60 and rear folding arm 64 are held together by folding arm pin 62. Front folding arms 60 and 60A include a plurality of ribs 61 and 61A providing for strength, rigidity and aesthetics. Referring to FIGS. 4 and 8, front folding arm 60 includes a male member 70 which is inserted into a female member 72 of housing 22. This functions as a hinge to allow folding of front folding arm 60. Similarly, rear folding arm 64 includes a male member 74 for insertion into female member 76 of rear folding arm 64. The front folding arm and rear folding arm are held together by a folding arm pin 62.

Referring to FIGS. 10-10C, the front folding arm 60 and rear folding arm 64 include fold locking locations 78 and 80. Referring to FIG. 10B, the folding lock locations allow the folding of the front folding arm at approximately 173 degrees of rotation. Referring to FIG. 10C, the folding lock location between the front folding arm and rear folding arm allows it to lock at approximately 138 degrees of rotation.

Referring to FIGS. 1 and 1A, rear folding arms 64 and 64A include an overmolded thermoplastic resin 82 providing comfort and fit on the user's head.

Figure 4A:
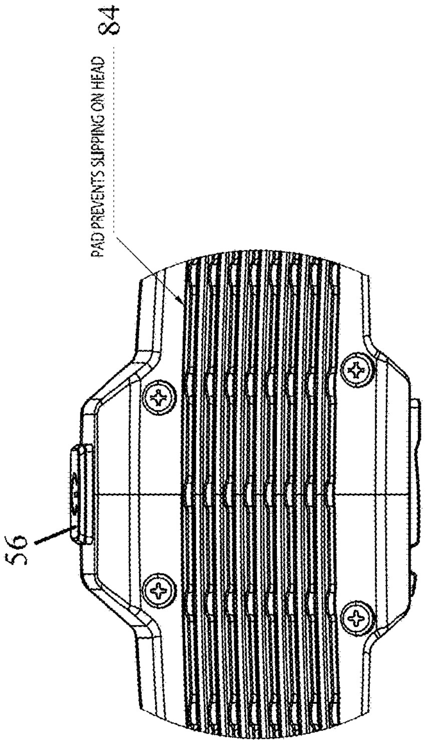
FIG. 4A is an enlarged view of Section 4A of FIG. 4.
Figure 4:
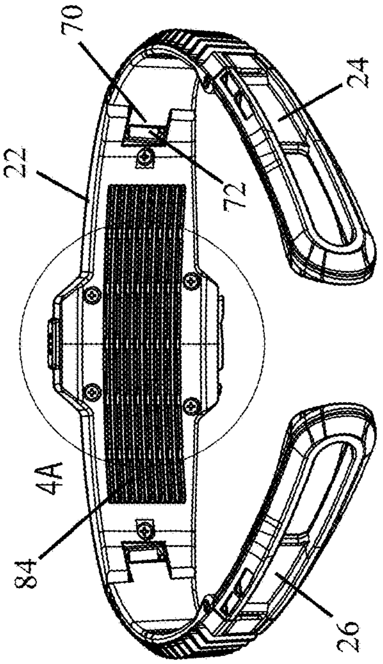
FIG. 4 is a rear view of FIG. 1.
Figure 6:
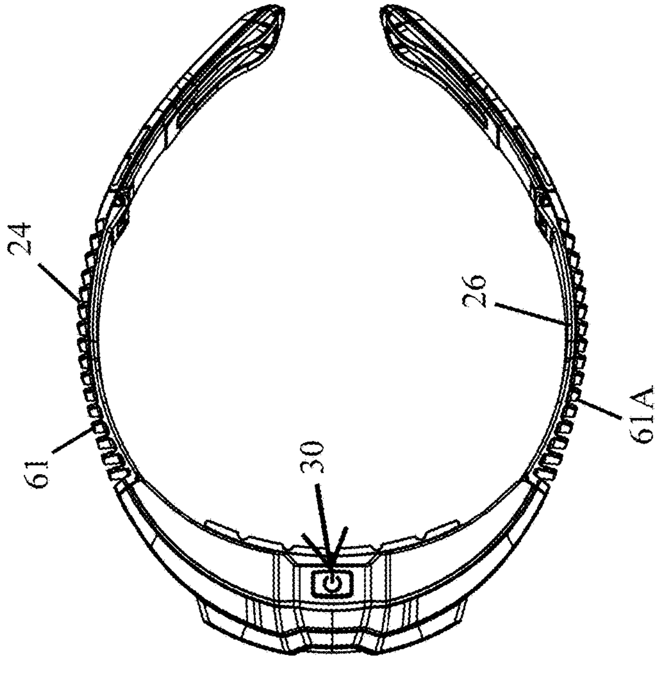
FIG. 6 is a top view of FIG. 1.
Figure 5:
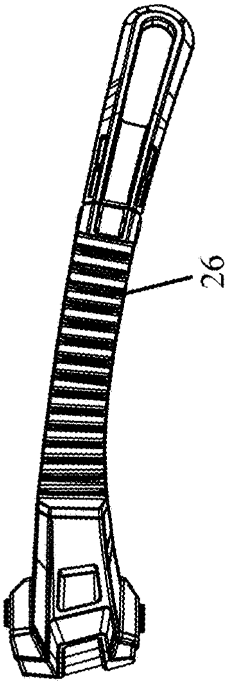
FIG. 5 is a side view of FIG. 1.

Referring to FIGS. 4 and 4A, housing 22 and, more particularly, rear housing 58 includes a pad 84 which prevents the light from slipping on the forehead. It is also made of a thermoplastic resin material which provides comfort on the user's forehead.

Figure 3:
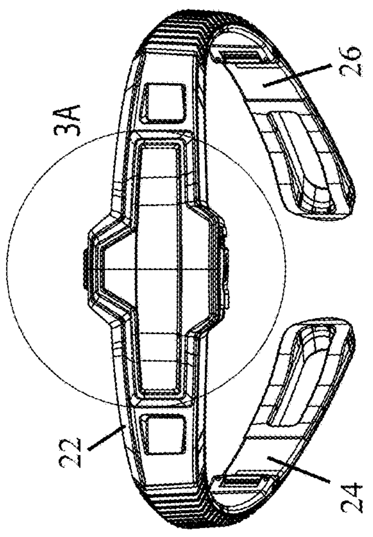
FIG. 3 is a front view of FIG. 1.

Referring to FIGS. 3 and 3A, there is shown the light sources for the head light. There is a first central area light 28 and a spotlight 29. By pushing button 56 of on/off switch 30 the area light 28 will turn on. Pushing button 56 a second time turns on the spotlight 29 alone. Pushing button 56 a third time turns on both the area light 28 and the spotlight 29. The light is turned off by pushing button 56 a fourth time.

Figure 9A:
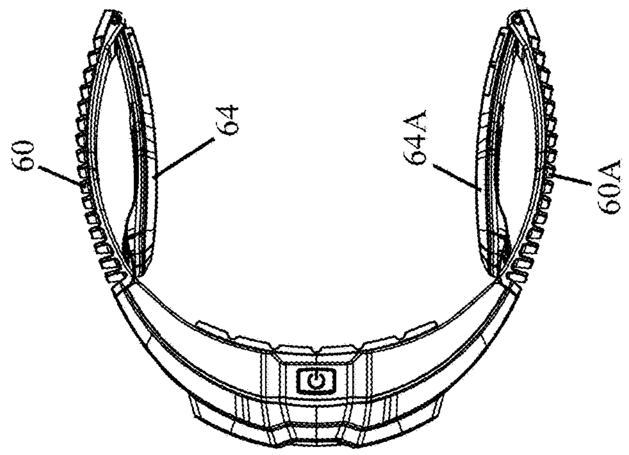
FIG. 9A shows the first folding of the arms.
Figure 9C:
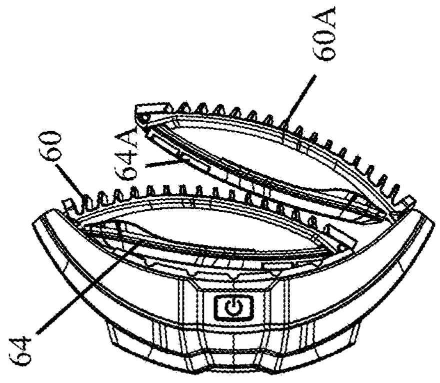
FIG. 9C is a top view of FIG. 9B.
Figure 9:
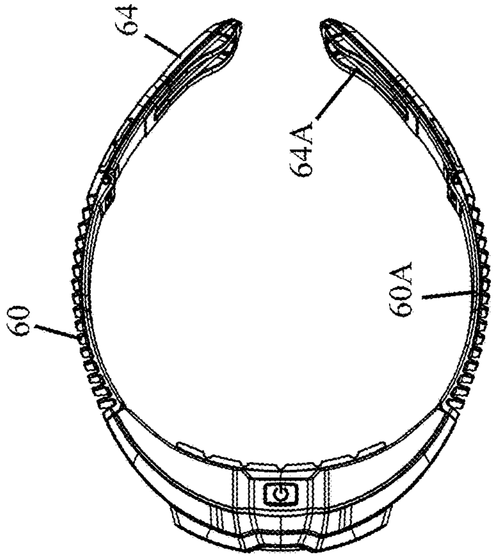
FIG. 9 is a top view of the light of FIG. 1.
Figure 9B:
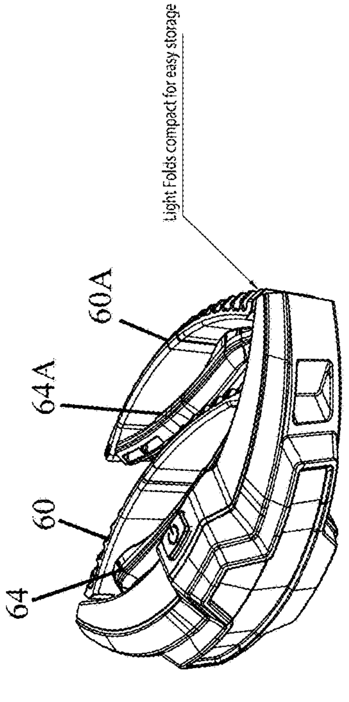
FIG. 9B shows the second folding of the arms.

Referring to FIGS. 9-9C, there is shown the movement of the folding arms 24 and 26. FIG. 9 shows the head light 20 as it is to be used on a user's head. FIG. 9A shows folding arms 24 and 26 with rear folding arms 64 and 64A in a first folded position. FIG. 9B shows front folding arms 60, 60A and rear folding arms 64, 64A in the folded position, thereby providing for compact and easy storage. FIG. 9C shows a top view of the folded head light 20.

Figure 7:
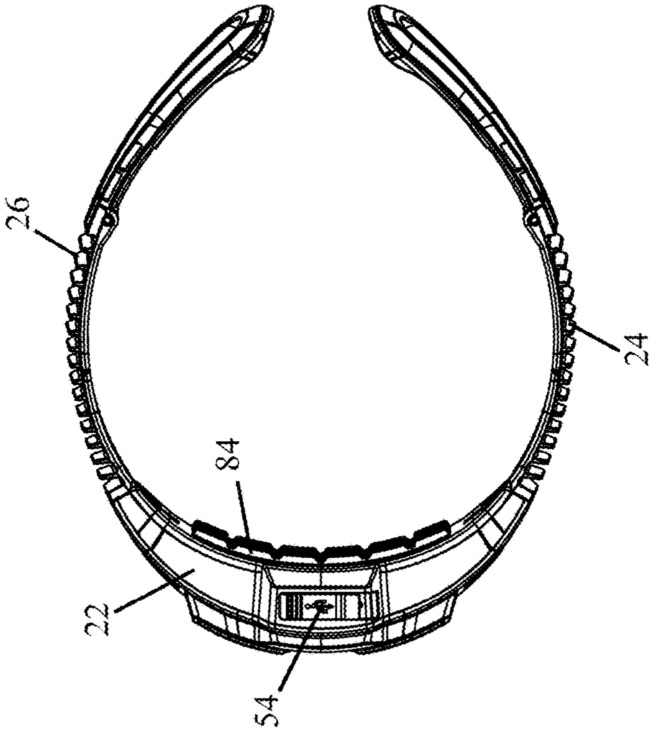
FIG. 7 is a bottom view of FIG. 1.

Referring to FIGS. 7 and 8, the head light 20 includes a rechargeable battery 52 and an USB port 54*a* for recharging the battery. There is a USB port cover 54 covering the USB port 54*a* and a charge indicator light and lens 54*b*.

In use, the user places head light 20 on a user's head wherein housing 22 is placed on the user's forehead and folding arms 24 and 26 are pulled outward around the user's head and rest comfortably on the user's ears. The user pushes button 56 of switch 30 to turn on the central area light. As noted above, the user may also turn on the spotlight alone or the central area light and spotlight together. The user thereafter focuses the light source with the user's head on the area of interest.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

The invention claimed is:

1. A head light comprising a housing having a light source, a power source to power the light source and adapted to fit on a user's forehead, a first foldable arm attached to a first side of the housing and a second foldable arm attached to a second side of the housing, wherein the first and second foldable arms are adapted to rest on the user's ears.

2. The head light of claim 1 wherein the first and second foldable arms fold in two places.

3. The head light of claim 1 wherein the first and second foldable arms include an elastomer pad at an end thereof.

4. The head light of claim 1 wherein the housing includes an elastomer pad adapted to engage the user's forehead.

5. The head light of claim 1 wherein the light source comprises a central light source and a spotlight.

6. The head light of claim 5 wherein the light source is controlled by a switch.

7. The head light of claim 6 wherein the light source is an LED light.

8. The head light of claim 1 further comprising a switch to control the light source and the power source is a rechargeable battery.

9. The head light of claim 8 further comprising a charge port and a charge indicator.

10. A head light comprising a housing having a light source, a power source to power the light source and adapted to fit on a user's forehead, a first foldable arm attached to a first side of the housing and foldable in two places and a second foldable arm attached to a second side of the housing foldable in two places, wherein the first and second foldable arms are adapted to rest on the user's ears.

11. The head light of claim 10 wherein the light source comprises a central light source and a spotlight controlled by a switch.

12. The head light of claim 11 wherein the light source is an LED light.

13. The head light of claim 12 wherein the power source is a rechargeable battery.

14. The head light of claim 13 further comprising a charge port and a charge indicator.

15. The head light of claim 14 wherein the first and second foldable arms include an elastomer pad at an end thereof.

16. The head light of claim 15 wherein the housing includes an elastomer pad adapted to engage the user's forehead.

* * * * *